United States Patent [19]
Riegler et al.

[11] Patent Number: 4,643,404
[45] Date of Patent: Feb. 17, 1987

[54] TILTABLE METALLURGICAL VESSEL ARRANGEMENT

[75] Inventors: Ernst Riegler, Enns; Ernst Zajicek, Ottensheim; Johann Mühlbauer, Peilstein, all of Austria

[73] Assignee: Voest-Alpine Aktiengesellschaft, Linz, Austria

[21] Appl. No.: 737,203

[22] Filed: May 23, 1985

[30] Foreign Application Priority Data

Jun. 1, 1984 [AT] Austria .................................. 1813/84

[51] Int. Cl.⁴ .............................................. C21C 5/48
[52] U.S. Cl. .................................... 266/240; 222/601; 266/272; 373/83
[58] Field of Search ................. 266/236, 240, 45, 272; 222/599, 600, 601; 373/83, 84, 143

[56] References Cited

U.S. PATENT DOCUMENTS

| | | | |
|---|---|---|---|
| 2,268,482 | 12/1941 | Harvey | 222/599 |
| 4,116,372 | 9/1978 | Horiguchi et al. | 222/600 |
| 4,232,855 | 11/1980 | Hartl | 266/272 |
| 4,401,296 | 8/1983 | Ploetz et al. | 266/236 |

FOREIGN PATENT DOCUMENTS

| | | |
|---|---|---|
| 368625 | 2/1982 | Austria . |
| 3102499 | 8/1982 | Fed. Rep. of Germany . |
| 2107624 | 5/1983 | United Kingdom ............... 222/601 |

Primary Examiner—Melvyn J. Andrews
Assistant Examiner—Robert L. McDowell
Attorney, Agent, or Firm—Collard, Roe & Galgano

[57] ABSTRACT

A tiltable metallurgical vessel has a convexly curved bottom, and is supported on a cradle frame tiltably mounted on the base. In order to provide a metallurgical vessel of high operational safety in which the melt covers as short a path as possible during tapping, scumming is feasible in a simple way, the retention of a residual sump in the vessel is possible, at least one eccentrically arranged, closeable tap opening is provided in the bottom above a receptacle placeable into the tapping position. The tap opening is closeable by a closure flap pivotable by a lever. The lever is connected with a shaft for rotation therewith, a pressure medium cylinder is mounted on the cradle frame, and an actuation rod of sufficient length to reach beyond the radiation region of the receptacle enables the shaft to be rotatable by the cylinder through the actuation rod.

5 Claims, 6 Drawing Figures

TILTABLE METALLURGICAL VESSEL ARRANGEMENT

The invention relates to a tiltable metallurgical vessel, in particular an electric melting furnace, or a plasma primary melting furnace, having a convexly curved bottom, the vessel being supported on a cradle frame tiltably mounted on the base.

A metallurgical vessel of this type is known from Austrian Pat. No. 368,625. This known vessel is tilted during tapping until the steel melt runs out through a spout arranged laterally of the vessel, into a ladle positioned below the spout.

In order to shorten the path of the melt during tapping, it is known (U.S. Pat. No. 4,116,372 and U.S. Pat. No. 4,401,296), to stationarily arrange the vessel so as to be immovable and to provide it with a tap opening in the bottom, which tap opening is closeable by means of a pivotable closure flap which may be pressed against the bottom of the vessel by means of a pressure medium cylinder. This involves difficulties during scumming because the tap opening, can be opened just once by pivoting the closure flap and cannot be closed any more until the vessel is emptied. Hence follows the necessity to pour the slag into the ladle receiving the steel melt, which has a variety of disadvantages, such as a high wear of the ladle brickwork, the risk of re-phosphorization as well as difficulties in the course of a subsequent treatment of the steel melt in the ladle.

The tap opening, of the known non-tiltable vessel must be provided on the lowermost point of the bottom in order to be able to completely empty the vessel. If one wants to retain a certain amount of residual steel and residual slag in the vessel after tapping, i.e., to melt according to the so-called "liquid sump operation", one is forced to arrange at least one further tap opening in addition to the tap opening at the lowermost point, at a distance therefrom. By opening this second tap opening, it is possible to retain a residual sump in the interior, yet it is impossible to vary the residual-sump amount.

The invention aims at avoiding these disadvantages and difficulties and has as its object to provide a metallurgical vessel in which the melt covers as short a path as possible during tapping, by which, however, scumming is feasible in a simple way and the retention of a residual sump in the vessel is possible. The vessel has a high operational safety, in particular with regard to the tap hole closure.

This object is achieved with a tiltable metallurgical vessel of the initially defined kind in that at least one eccentrically arranged closeable tap opening is provided in the bottom above a receptacle placeable into the tapping position, which tap opening is closeable by a closure flap pivotable by a lever, which lever is connected with a shaft for rotation therewith. The shaft is rotatable by means of a pressure medium cylinder mounted on the cradle frame, via an actuation rod reaching beyond the radiation region of the receptacle.

In order to be able to actuate the closure flap by a large angle with a short piston stroke of the pressure medium cylinder, the actuation rod preferably comprises a toothed rack provided with an internal cooling and meshing with a toothed gear mounted on the shaft.

A preferred embodiment is characterized in that the actuation rod is guided through the cradle frame and the pressure medium cylinder is fastened to the external side of the cradle frame. Thereby, it is possible to move the pressure medium cylinder into a specially protected zone even with the tap opening arranged within the cradle frame, the cradle frame thus assuming a screening function for the pressure medium cylinder, in addition to its carrying function.

In order to prevent an undesired opening of the closure flap, the actuation rod suitably is lockable in the closed position of the closure flap by a catch arranged on the cradle frame.

The invention will now be explained in more detail by way of two exemplary embodiments and with reference to the accompanying drawings, wherein.

Figure 1:
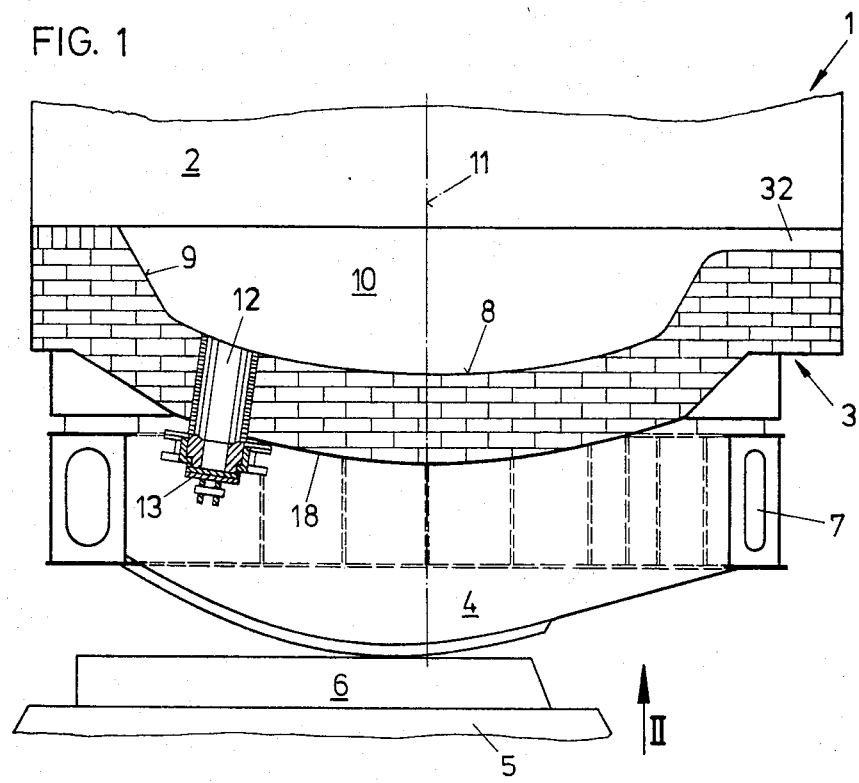
FIG. 1 is a vertical section through an electric melting furnace.

A metallurgical vessel 1, which is illustrated as an electric melting furnace and composed of an upper part 2 and a lower part 3, is tiltably mounted by means of cradles 4 on cradle substructures 6 arranged on the base 5. The cradles 4 are mounted on a cradle frame 7, on which the lower part 3 of the vessel is disposed.

The lower part 3 is formed by a convexly curved bottom 8 and laterally upwardly extended side walls 9 to form a tub 10 accommodating the melt bath and lined with refractory bricks. A tap opening 12 is provided in the bottom 8 eccentrically of the central axis 11 of the vessel 1 having a circular ground section, which tap opening, as is apparent from FIG. 2, lies within the cradle frame 7.

To close the tap opening 12, a closure flap 13 is provided, which is hinged to a lever 14 that is connected with a shaft 15 in a rotationally fast manner. The shaft 15 is rotatably journaled on the plate jacket 18 of the bottom 8 by means of two bearings 16, 17. To actuate the shaft 15, a toothed gearing 19 is mounted in a rotationally fast manner on the end opposite the lever-carrying end engages with a toothed rack 20. The toothed rack 20, which is equipped with bores 21 in order to provide an internal cooling, is arranged on the end of an actuation rod 22 reaching through the cradle frame 7 to its external side 23. For an exact guidance of the actuation rod 22, holding means 24 are provided, which overlap the former in a bracket-like manner, one holding means being arranged on the plate jacket 18 of the bottom 8 and one being arranged on the cradle frame 7.

To the end of the actuation rod 22 reaching outwardly through the cradle frame, a piston 25 of a pressure medium cylinder 26 is hinged, which is mounted to a console 27 fastened to the cradle frame 7. The piston 25 of the pressure medium cylinder is spring-biased such that, in case of a pressure loss, the closure flap 13 of the tap opening 12 is opened by spring force. In order to prevent an unintentional opening of the closure flap 13, a further pressure medium cylinder 28 is provided, which is arranged in the interior 29 of the box-like cradle frame 7 and serves to actuate a catch 30 engaging in the actuation rod 22 as soon as the closure flap 13 has been placed into the position closing the tap opening.

Figure 3:
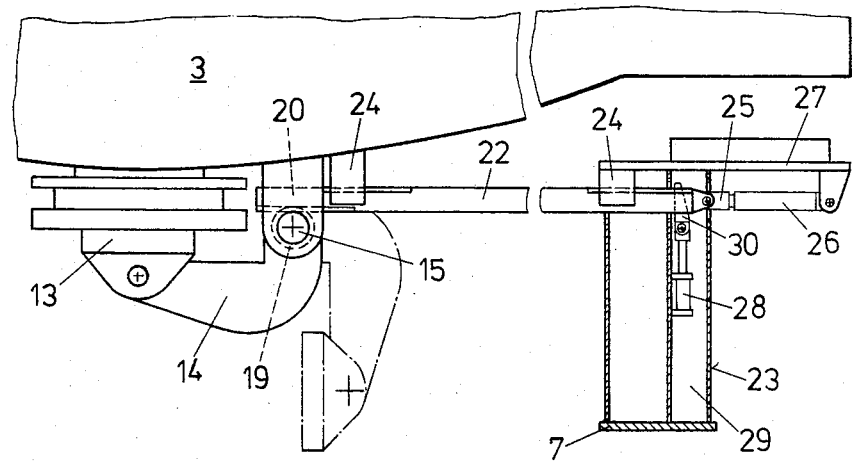
FIG. 3 illustrates a section along line III—III of FIG. 2.

The stroke of the pressure medium cylinder 26 actuating the closure flap 13 is dimensioned such that the lever can be pivoted by about 90°, as is apparent from FIG. 3, the closure flap 13 thus completely clearing the tap opening 12. By means of an electric locking control it is ensured that the catch 30, prior to opening of the closure flap 13, must be moved into a retracted position. In order that the catch will not automatically and unintentionally assume this position at a pressure drop, the piston of the pressure medium cylinder 28 actuating the catch 30 is spring-biased. The spring urges the catch 30 into the locked position illustrated in FIG. 3, from which it must be pushed back manually, if necessary.

Figure 2:
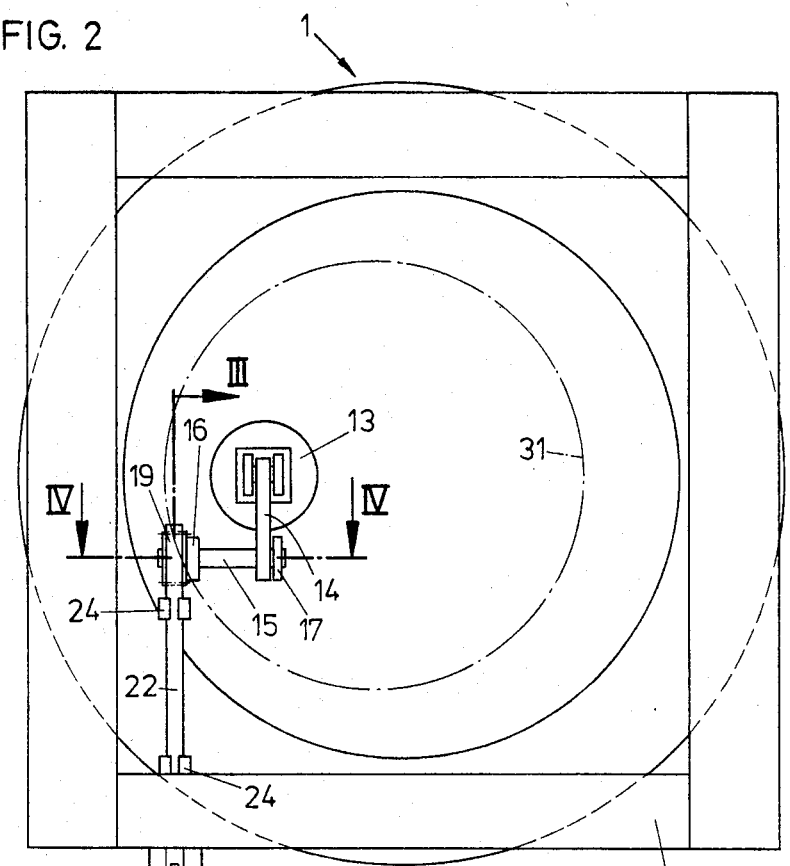
FIG. 2 is an elevational view in the direction of the arrow II—II of FIG. 1, of a first embodiment.
Figure 4:
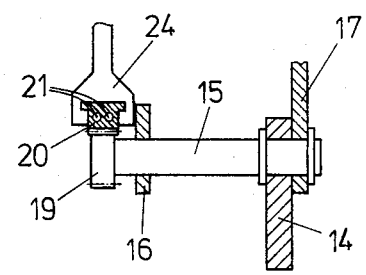
FIG. 4 is a section along line IV—IV of FIG. 2.

As can be seen from FIG. 2, the pressure medium cylinder 26 is arranged outside of the radiation region of the ladle 31 positioned below the tap opening 12—whose mouth diameter is indicated in FIG. 2 by dot-and-dash lines -, on account of an appropriate longitudinal dimension of the shaft 15 and of the actuation rod 22. The cradle frame 7, according to this embodiment, serves to protect the pressure medium cylinder 26 arranged outside of the cradle frame 7 without impeding the accessibility to this pressure medium cylinder 26.

The arangement functions in the following manner: At the beginning of melting, the tap opening 12 is filled with granulates that prevent the entry of melt into the tap opening 12 and thus the advancing of the melt to the closure flap 13. These granulates sinter on the end of the tap opening 12, facing the melt. During tapping, the closure flap 13 is opened. On account of the ferrostatic pressure, the sinter bridge formed by the granulates breaks and the melt is free to run out through the tap opening 12. Depending on the tilted position of the vessel 1, either the total melt will flow out or a residual melt amount will be retained in the vessel. For the purpose of scumming, the vessel 1 is tilted into the opposite direction until the slag will flow out through the slag opening 32, which is closeable by a door (not illustrated).

Figure 5:
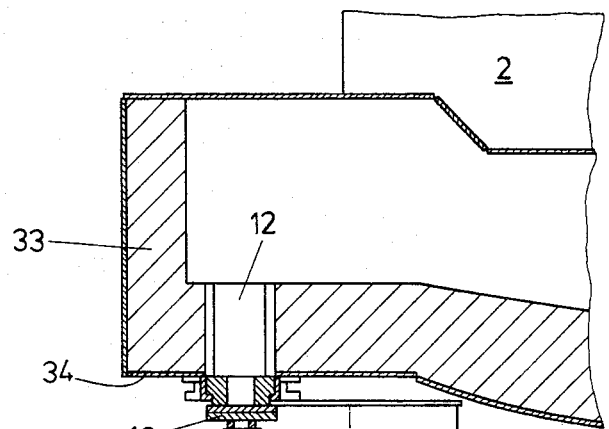
FIG. 5 illustrates a detail of a second embodiment in a representation analogous to FIG. 1.
Figure 6:
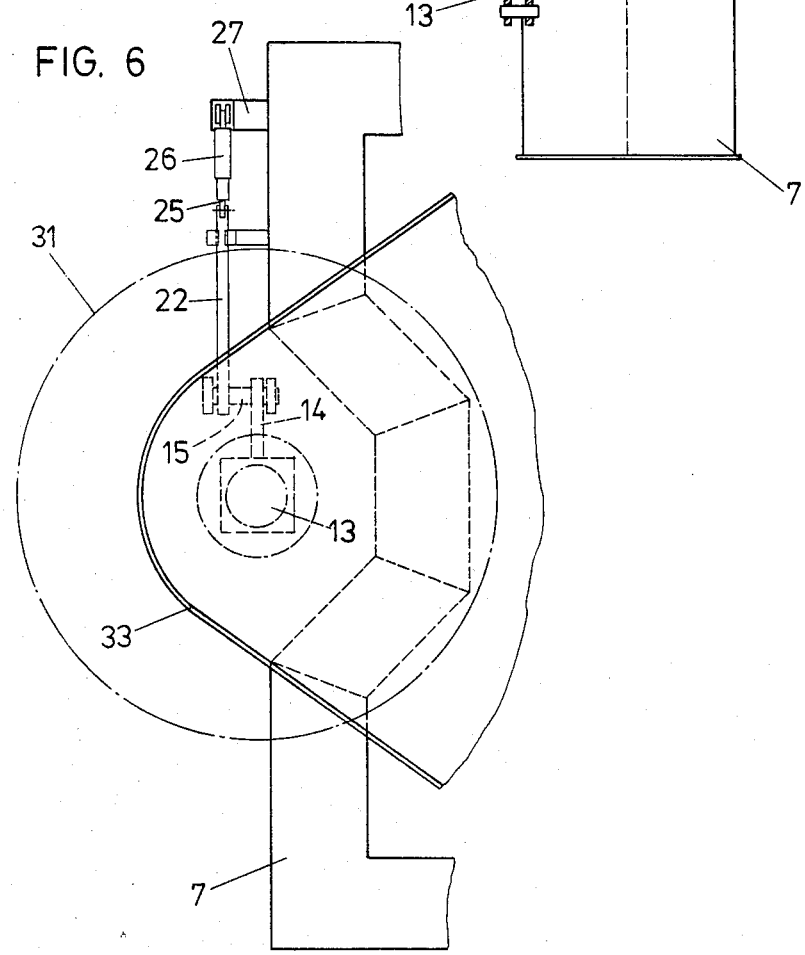
FIG. 6 is a ground plan of the second embodiment.

According to the embodiment illustrated in FIGS. 5 and 6, the lower part of the metallurgical vessel comprises a bay-like projection 33 reaching beyond the cradle frame 7, at which site the cradle frame is recessed. The shaft 15 carrying the lever 14 and the toothed gearing 19, is mounted on the plate jacket 34 of the projection 33. The pressure medium cylinder 26, in turn, is hinged to a console 27 rigidly arranged on the cradle frame. In this case, too, the actuation rod 22 is dimensioned such that it reaches beyond the radiation region, i.e. the mouth of the ladle 31 illustrated in dot-and-dash lines in FIG. 6, which has been positioned below the tap opening 12.

What we claim is:

1. A tiltable metallurgical vessel arrangement having a convexly curved bottom and including a base, a cradle frame tiltably mounted on said base for supporting said vessel for tilting between an upright position and a tapping position, a receptacle placeable in the tapping position below at least one tap opening eccentrically arranged in said bottom, a closure flap for closing said tap opening in the upright position of the vessel, a lever for pivoting said closure flap, a shaft connected with said lever for rotation therewith, a pressure medium cylinder mounted on said cradle frame, and an actuation rod having a sufficient length to reach beyond the radiation region of said receptacle, said shaft being rotatable by said pressure-medium cylinder through said actuation rod.

2. An arrangement as set forth in claim 1, further comprising a toothed gearing on said shaft and a toothed rack on said actuation rod to mesh with said toothed gearing.

3. An arrangement as set forth in claim 2, wherein said toothed rack has internal cooling means.

4. An arrangement as set forth in claim 1, wherein said actuation rod is led through said cradle frame and said pressure medium cylinder is fastened to the external side of said cradle frame.

5. An arrangement as set forth in claim 4, further comprising a catch arranged on said cradle frame for locking said actuation rod in the closed position of said closure flap.

* * * * *